UNITED STATES PATENT OFFICE.

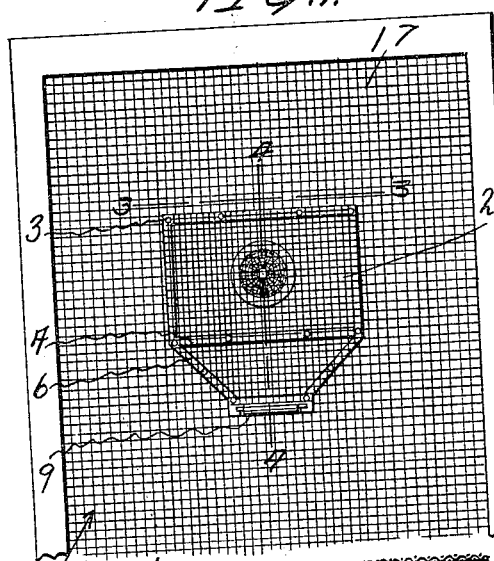
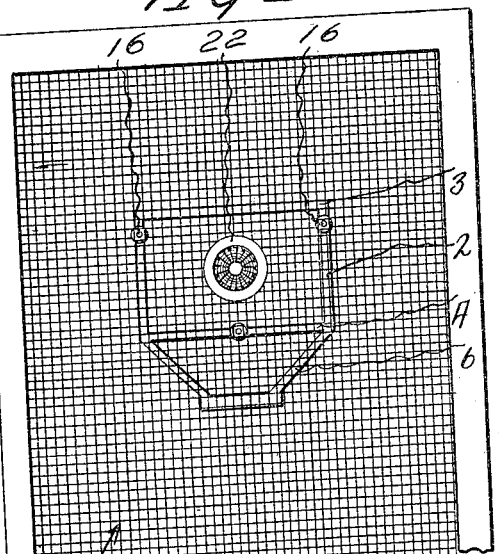
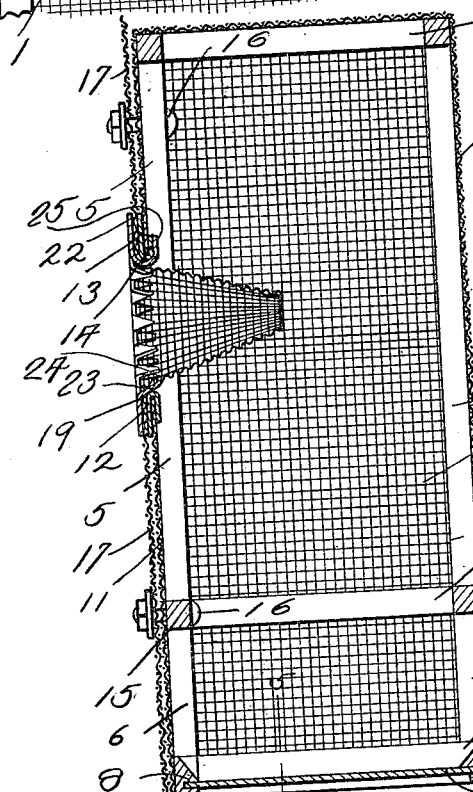
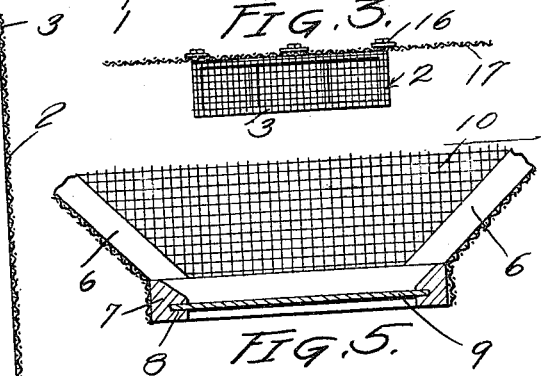
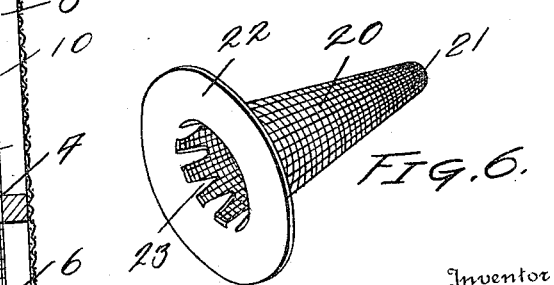

FRANK BEDORE, OF GAGETOWN, MICHIGAN.

INSECT-TRAP.

1,210,032.    Specification of Letters Patent.    Patented Dec. 26, 1916.

Application filed March 28, 1916. Serial No. 87,326.

*To all whom it may concern:*

Be it known that I, FRANK BEDORE, a citizen of the United States, residing at Gagetown, in the county of Tuscola, State of Michigan, have invented certain new and useful Improvements in Insect-Traps; and I do hereby declare the following to be a full, clear, and exact description of the invention, such as will enable others skilled in the art to which it appertains to make and use the same.

The present invention is directed to improvements in insect traps, and has for its object to provide a device of this character adapted to be secured to the inner surface of a screen door or window screen.

A further object of the invention is to provide a trap especially adapted for trapping flies, the same being constructed in such a manner that the flies when entering the opening in the screen will finally enter the trap from whence they may be removed and destroyed as desired.

A still further object of the invention is to provide novel means for attaching the entrance cone to the screen so that it will be held positively against accidental displacement.

With these and other objects in view, this invention resides in the novel features of construction, formation, combination and arrangement of parts to be hereinafter more fully described, claimed and illustrated in the accompanying drawing, in which:—

Figure 1 is a fragmentary rear view of a screen door or frame, showing the trap in place thereon. Fig. 2 is a front elevation of the same. Fig. 3 is a sectional view on line 3—3 of Fig. 1. Fig. 4 is a sectional view on line 4—4 of Fig. 1. Fig. 5 is a sectional view on line 5—5 of Fig. 4. Fig. 6 is a detail perspective view of the entrance cone supporting flange.

Referring to the drawing 1 indicates a section of a screen door or window frame, and 2 the trap, said trap consisting of upper and lower rectangular frames 3 and 4, respectively, said frames being held in vertically spaced relation by posts 5.

Depending from the frame 4 are inclined frames 6 which support the spaced bars 7, said bars being provided with longitudinal grooves 8 for slidably receiving the closure plate 9. It will be of course understood that the trap is covered with suitable wire mesh 10, which may be secured to the trap in any suitable manner.

The sheet of mesh 11 is provided with a circular opening 12, and encircling said opening is a metallic ring 13, the inner periphery of which being provided with a plurality of pliable fingers 14, which are bent into engagement with the inner surface of the sheet 11, thus holding the ring in place and covering the ragged wheel of the opening.

The outermost posts 5, and the outermost bar 15 of the frame 4 are provided with bolts 16 which penetrate the screen 17 of the member 1, and have engaged thereon nuts 18 which serve to hold the trap in firm engagement with the screen 17. The screen 17 is provided with a circular opening 19 which registers with the opening 12, the purpose of which will appear later.

The entrance cone 20 is formed from suitable wire mesh and has its minor end provided with an exit 21. The major end of the cone 20 has associated therewith a sheet metal ring 22, the inner periphery of which is provided with a plurality of tangs 23, certain of said tangs being engaged with the outer surface of the cone, while the remaining tangs engage the inner surface, said tangs having their ends bent, as at 24 for engaging the cone to hold the same firmly connected to the ring. The ring is further provided with resilient fingers 25, and preferably three in number, said fingers being adapted to be bent laterally and into engagement with the fingers 14 of the ring 13, thus holding the cone with its minor end projected into the trap.

It will be noted that the screen 17 of the member 1 is engaged between the rings 13 and 22 so that the major end of the cone opens outwardly. Thus it will be seen that when the trap is in place on the screen 17 that flies or other insects which crawl upon the outer surface of the screen 17 will naturally when reaching the cone 20 enter the same, and will pass through the exit 21, thereby being trapped.

From the foregoing description it will be seen that a trap has been provided which can be easily and quickly attached to a window screen or door, and that after the insects have been trapped the same can be removed upon removing the closure 10.

What is claimed is:—

An insect trap comprising a box like casing, the inner wall of the casing having an opening formed therein, an entrance cone, a sheet metal ring, said ring having its periphery provided with a plurality of tangs, the ends of said tangs being bent in opposite directions and into engagement with the cone to attach the cone to said ring, a plurality of pliable fingers carried by the ring and adapted to be bent into engagement with the outer surface of said inner wall to hold the cone with the minor end projected into the casing, said ring resting flush against the inner surface of the screen of a door or window, and means carried by the casing for detachably connecting the same to the window or door screen.

In testimony whereof, I affix my signature, in the presence of two witnesses.

FRANK BEDORE.

Witnesses:
 HEBERT LAFOVE,
 EDW. G. DUCKER.

Copies of this patent may be obtained for five cents each, by addressing the "Commissioner of Patents, Washington, D. C."